(12) United States Patent
Scholand et al.

(10) Patent No.: US 9,231,675 B2
(45) Date of Patent: Jan. 5, 2016

(54) RECEIVER AND METHOD FOR DETECTING A PRE-CODED SIGNAL

(71) Applicants: Tobias Scholand, Muelheim (DE); Biljana Badic, Duesseldorf (DE); Rajarajan Balraj, Duesseldorf (DE); Peter Jung, Duisburg (DE); Guido Bruck, Voerde (DE); Zijian Bai, Duisburg (DE); Stanislaus Iwelski, Koeln (DE)

(72) Inventors: Tobias Scholand, Muelheim (DE); Biljana Badic, Duesseldorf (DE); Rajarajan Balraj, Duesseldorf (DE); Peter Jung, Duisburg (DE); Guido Bruck, Voerde (DE); Zijian Bai, Duisburg (DE); Stanislaus Iwelski, Koeln (DE)

(73) Assignee: Intel Deutschland GmbH, Neubiberg (DE)

( * ) Notice: Subject to any disclaimer, the term of this patent is extended or adjusted under 35 U.S.C. 154(b) by 381 days.

(21) Appl. No.: 13/660,279

(22) Filed: Oct. 25, 2012

(65) Prior Publication Data

US 2013/0107932 A1    May 2, 2013

(30) Foreign Application Priority Data

Oct. 28, 2011    (DE) .......................... 10 2011 054 913

(51) Int. Cl.
*H04B 7/02* (2006.01)
*H04L 1/02* (2006.01)
*H04B 7/04* (2006.01)
*H04B 7/08* (2006.01)

(52) U.S. Cl.
CPC ............ *H04B 7/0452* (2013.01); *H04B 7/0456* (2013.01); *H04B 7/0854* (2013.01)

(58) Field of Classification Search
CPC ... H04B 7/0452; H04B 7/0456; H04B 7/0854
USPC .......................... 375/260, 267, 295, 316, 324
See application file for complete search history.

(56) References Cited

U.S. PATENT DOCUMENTS

2009/0323773 A1    12/2009  Bala et al.
2011/0085627 A1*    4/2011  Kangas et al. ................ 375/346

OTHER PUBLICATIONS

J. Duplicy, B. Sadie, R. Balraj, P. Horvath, F. Kaltenberger, R. Knopp, I. Kovacs, H. Nguyen, D. Tandur and G. Vivier: , MU-MIMO in LTE Systems, EURASIP Journal on Wireless Communications and Networking, vol. 2011, pp. 1-13, 2011.
E. Larsson, Robust structured interference rejection combining, in Proceedings of IEEE Wireless Communications and Networking Conference 2005, vol. 2, New Orleans, LA USA, Mar. 2005, pp. 922-926.
0. Renaudin, V.-M. Kolmonent, P. Vainikainent, and C. Oestges, ,Impact of correlation matrix estimation accuracy on the computation of stationarity intervals, EuCAP '10 (Barcelona, Spain), Apr. 2010.
3GPP 36.201, ,Evolved Universal Terrestrial Radio Access (E-UTRA); LTE physical layer, General description, 3GPP, Sophia Antipolis, Technical Specification 36.201 v8.3.0, Mar. 2009.

(Continued)

*Primary Examiner* — Freshteh N Aghdam
(74) *Attorney, Agent, or Firm* — Eschweiler & Associates, LLC

(57) ABSTRACT

A multi-user MIMO receiver of a UE in question for detecting a pre-coded signal includes a unit configured to blindly estimate information concerning a pre-coding vector for a paired UE, which is operated on the same resource as the multi-user MIMO receiver, based on received data. Further, the multi-user MIMO receiver comprises an equalizer configured to equalize the pre-coded signal based on the estimated information concerning the pre-coding vector for the paired UE.

18 Claims, 3 Drawing Sheets

(56) References Cited

OTHER PUBLICATIONS

3GPP 36.211, ,Evolved Universal Terrestrial Radio Access (E-UTRA); Physical Channels and Modulation, 3GPP, Sophia Antipolis, Technical Specification 36.211 v8.9.0, Dec. 2009.

3GPP 36.212, ,Evolved Universal Terrestrial Radio Access (E-UTRA); Multiplexing and channel coding, 3GPP, Sophia Antipolis, Technical Specification 36.212 v8. 8.0, Sep. 2009.

3GPP 36.213, ,Evolved Universal Terrestrial Radio Access (E-UTRA); Physical layer procedures, 3GPP, Sophia Antipolis, Technical Specification 36.213 v8.8.0, Sep. 2009.

Bai, Z. (and others): On the Receiver Performance in MU-MIMO Transmission in LTE. In: The Seventh International Conference on Wireless and Mobile Communications (ICWMC 2011), Jun. 19, 2011, pp. 128-133.

* cited by examiner

RECEIVER AND METHOD FOR DETECTING A PRE-CODED SIGNAL

REFERENCE TO RELATED APPLICATION

This application claims priority to German application number 10 2011 054 913.7 filed on Oct. 28, 2011.

FIELD

The invention relates to a multi-user MIMO receiver for detecting a pre-coded signal as well as a method by which a pre-coded signal can be detected in a multi-user MIMO receiver.

BACKGROUND

Multiple-Input Multiple-Output (MIMO) transmissions have recently been introduced in many modern wireless communication systems because they allow further increased data rates. For example, in the standardization committee 3GPP TS ($3^{rd}$ Generation Partnership Project Technical Standardization) a further development of UMTS (Universal Mobile Telecommunications System) is specified, named Long Term Evolution (LTE), which uses MIMO transmissions.

MIMO systems are characterized in that at each the transmitter side and the receiver side several antennas are provided for transmitting and/or receiving the signals. This allows the use of the spatial dimension for transmitting information, thus a higher spectral efficiency and higher data rates are possible without any increase in bandwidth.

Multi-user (MU) MIMO transmission systems allow the simultaneous transmission of different data streams to various users (receivers) on the same resource, i.e., for example, on the same frequency and/or at the same time. This may be achieved by a spatial multiplexing in the transmitter. In spatial multiplexing of signals for several users, the information symbols are pre-coded prior to their transmission, in order to multiplex the information in the spatial domain. The pre-coding used for a receiver will be signaled by the transmitter to the respective receiver so that the (receiver) is capable of detecting the signal pre-coded for it. While high requirements must be set regarding the transmitted different data streams being uncorrelated for a single-user (SU) MIMO transmission, in which several such pre-coded data streams are transmitted to a single user due to the proximity of the receiver antennas, the MU-MIMO transmission profits from the natural independence of the signals obtained at antennas of different receivers (and thus distanced from each other).

In spite of the spatial multiplexing of the different signals transmitted via the same resource, the interference by the other multiplexed signal or signals represents a considerable degree of disturbance for the signal to be detected by the receiver in question. By a suitable selection of the pre-coding vectors in the transmitter for the different receivers, the interference caused by the spatial multiplexing can be reduced, but it remains significant and leads to loss of performance in the receiver.

One option to suppress interferences caused for other users by the signals spatially multiplexed on the same resource comprises detecting these signals in the receiver and thus utilizing the deterministic nature of the interfering signals, i.e., considering them different from white noise. Such receivers are also called IA (Interference Aware) receivers. IA-receivers, such as, for example, IRC (Interference Rejection Combiners) and MMSE (Minimum Mean Square Error) receivers, are therefore particularly well suited for MU-MIMO transmission systems.

In the past, however, IRC and MMSE receivers required a perfect awareness of the interfering channel occurring at the receiver in question, via which the interfering signals are detected (i.e., the spatially multiplexed signal(s) for the other user(s) via the same resource or resources). This interfering channel comprises the MIMO channel for the receiver in question and the pre-coding vector or vectors for the mobile stations operated on the same resource. The MIMO channel of the receiver in question is continuously estimated thereby for the purpose of its own signal detection. The pre-coding vector or vector(s) for the other mobile stations are commonly not communicated by the base station (e.g., eNodeB) to the receiver in question (i.e., the receiver in the mobile station in question). Consequently, a mobile station is not or not entirely aware of the pre-coding vector or vectors for the other mobile stations operated on the same resource. This leads to the consequence that comprehensive information required for the use of IRC or MMSE receivers regarding the interfering channel is not provided at the receiver in question.

BRIEF DESCRIPTION OF THE DRAWINGS

The following description and the drawings serve for a more detailed understanding of further developments and embodiments of the invention. The drawings serve, together with the description, to explain the principles of embodiments. Additional embodiments and many intended advantages of embodiments are better understood with reference to the following description. Here, features described in the context with various embodiments may be combined with each other, to the extent this is technically possible or contradictions are not explicitly mentioned.

DETAILED DESCRIPTION

Figure 1:
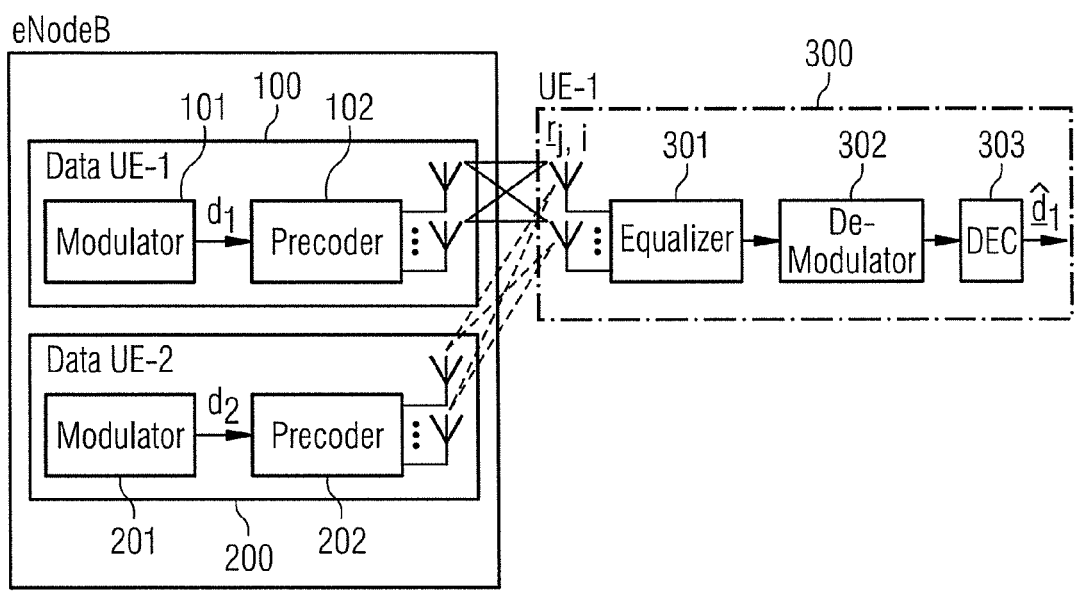
FIG. 1 shows an example of a block diagram of a transmitter and a receiver of a physical channel.

In the following, a complex baseband notation is used, which uses matrix vector algebra to describe the system structure and signal processing. Time-discrete variables are shown by vectors, which are marked in lowercase characters in bold. Matrices are shown capitalized in bold print. Complex values are underlined. Further, $(\bullet)^H$ marks the hermetic vector or the hermetic matrix, I represents the identity matrix and $E\{\bullet\}$ marks the expected value of the random variable stated in parentheses.

The following description is based on an example and generally not limited thereto using an MIMO-OFDM (MIMO-Orthogonal Frequency Division Multiplexing) system, which comprises $N_{subc}$ sub-carriers, $N_T$ transmission antennas, and $N_R$ receiver antennas. Such a system is underlying, for example, the standard LTE (Long Term Evolution), rel. 8 of the standardization committee 3GPP TS. Even though, in the following description, names are used from the LTE standard as examples, here the embodiments and the invention described are not restricted to the specific standards (for example, LTE, LTE Advanced) or releases thereof.

Further, in the following, using the terminology of UMTS and/or LTE standards, a device (mobile station) used by a mobile radio user for communication purposes is marked UE (user equipment). This may represent, for example, a mobile telephone, a laptop, or any other device. As is common in the LTE standard, base stations are marked eNodeB. These references are examples and represent no restriction to particular standards.

In the following, for reasons of a simplified illustration and without a general restriction, a system is discussed as an example, in which in addition to the UE in question (so-called "target UE") only one other UE is operated on the same resource using a spatially multiplexed signal. This additional UE is called a "paired UE." In general it is possible, though, that several such paired UEs (frequently also called "co-scheduled UEs") are present in the MU-MIMO transmission. The term paired UE therefore does not imply that only one such paired UE is present.

The system function, specific for the sub-carrier of such an MU-MIMO transmission, may be written in the form $$r_{j,i} = H_{j,i} p_{1,i} d_{1,j,i} + H_{j,i} p_{2,i} d_{2,j,i} + n_{1,j,i} \quad (2.1)$$

Here, $j=1, 2, \ldots, 14$ marks the index of the OFDM symbol in a sub-frame (with a standard cyclical prefix-setting in LTE systems), i marks the index of the sub-carrier in the respective OFDM symbol, $r_{j,i} \in \mathbb{C}^{N_R \times 1}$ marks the data vector received (by the receiver antennas) at the indicated position of the UE in question showing the UE index 1. $H_{j,i} \in \mathbb{C}^{N_R \times N_T}$ represents the MIMO channel matrix seen by the UE in question comprising the MIMO channel coefficient. $p_{\epsilon,j,i} \in \mathbb{C}^{N_T \times 1}$ and $d_{1,j,i} \in \mathbb{C}$ are the pre-coding vector or the symbol transmitted for the UE in question. $p_{2,j,i} \in \mathbb{C}^{N_T \times 1}$ and $d_{2,j,i} \in \mathbb{C}$ represent the pre-coding vector or the symbol transmitted for the paired UE of the MU-MIMO transmission. $n_{2,j,i} \in \mathbb{C}^{N_R \times 1}$ is the complex Gaussian random noise vector of the average value zero with $n_{1,j,i} \sim CN(0, N_0 I)$.

Without restrictions of the generality and in light of the definitions in LTE systems, $d_{1,j,i}$ and $d_{2,j,i}$ mark, e.g., QAM (Quadrature Amplitude Modulation) symbols with the same energy of symbols $E\{|d_{1,j,i}|^2\} = E\{|d_{2,j,i}|^2\} = E_d$. Both $p_{1,i}$ and $p_{2,i}$ are selected from the pre-coding vector codebook $\wp$ (so-called "pre-coding codebook"), which is defined, for example, by the LTE standards and shows a limited size of 4 and 16 vectors, for example, in case $N_T=2$ and/or $N_T=4$. The pre-coding codebook $\wp$ is known to the transmitter (in eNodeB) and each UE. Both $p_{1,i}$ as well as $p_{2,i}$ are independent from the OFDM symbol index in all sub-frames according to the configuration in LTE standards. Without limitation to the general applications, it is assumed that $d_{1,j,i}$, $d_{2,j,i}$, the coefficients in $H_{j,i}$, and the coefficients in $n_{1,j,i}$ are independent from each other and show an average value of zero.

In the event that inter-cell interference (ICI) is given at the UE in question, the distortion term in (2.1) should be modeled as a colored noise. In this regard, $n_{1,j,i}$ represents the thermal noise together with the inter-cell interference. The coefficients in $n_{1,j,i}$ are approximated as complex Gaussian-random variables with an average value of zero, and the covariance matrix of $n_{1,j,i}$ is defined as $R_n$, i.e., $n_{1,j,i} \sim CN(0, R_n)$. However, this has no effect upon the processing in the UE in question.

Due to the fact that MU-MIMO transmissions are symmetrical for both paired UEs, in the following the UE with the UE-index 1 is used for describing a detection of $d_{1,j,i}$ without generally being restricted thereto.

The receiver of the UE in question, used for an MU-MIMO transmission according to (2.1), serves to detect the desired signals, while it eliminates the interference of the paired UE (one or more). This way, the receiver of the UE in question can be called an IA receiver according to one example.

As already mentioned, previous IRC receivers are based on the assumption of a perfect awareness of the interfering channel, i.e., $H_{j,i} p_{2,j,i}$. In real systems, the perfect awareness of the interfering channel is frequently not given in the UE in question, since the signaling of the pre-coding vectors for the paired UEs would require an excessive signaling expense. This signaling expense would increase if a frequency-selective UE-pairing were provided in the MU-MIMO transmission. Accordingly, for example in LTE rel. 8, such a signaling of pre-coding vectors of paired UEs is not provided at the UE in question.

The receiver of a UE according to an example described in the following may be marked as a receiver, for example an IRC receiver, which can operate without the requirement of a priori knowledge of the interfering channel. Accordingly, here it may also be called a blind receiver or blind IRC receiver. A blind receiver might be based on initially estimating the pre-coding vector $p_{2,j,i}$ (or equivalently $H_{j,i} p_{2,j,i}$) and then, in awareness of the estimated interfering channel, an IA detection of the received signal is performed, for example by using a conventional IRC receiver. Here the term "blind" shall be understood such that an estimation of information is made regarding at least one coefficient of the pre-coding vector $p_{2,j,i}$ (equivalent to $H_{j,i} p_{2,j,i}$) in order to relieve the received signal from the interference of the interfering channel.

In the following, for better understanding the disclosure, several algorithms are disclosed according to which blind estimation of a pre-coding vector may be performed. The algorithms described here as examples may be modified, combined, and amended in various ways, without deviating from the principal idea of the present invention. In this regard, the following mathematic illustrations and explicit statements shall be considered examples, not restricting the broad concept of a blind estimation of information regarding a pre-coding vector for a paired UE underlying the present invention in any way, but rather explaining it by way of an example.

The estimated information regarding a pre-coding vector used for the paired UE may represent the pre-coding vector $p_{2,j,i}$ itself; an equivalent, for example $H_{j,i} p_{2,j,i}$; individual coefficients of these parameters; or another parameter, depending on the pre-coding vector $p_{2,j,i}$ used or individual coefficients thereof. The receiver in question (i.e., the receiver in the UE in question) gains knowledge from the estimation of information regarding the pre-coding vector used for a paired UE, neither known a priori nor provided by the transmitter by way of signaling, which allows the receiver to use the deterministic nature of the interfering channel for interference suppression at the UE in question.

A receiver for the signal detection in a sub-carrier specific system may, for example, be described using an IRC receiver according to $$m_{IRC}^H = \frac{p_{1,i}^H H_{j,i}^H R_{\overline{n}}^{-1}}{p_{1,i}^H H_{j,i}^H R_{\overline{n}}^{-1} H_{j,i} p_{1,i}} \quad (3.1)$$

Described in (3.1) are $$\underline{\eta} = H_{j,i} \underline{p}_{2,j,i} d_{2,j,i} + \underline{n}_{1,j,i} \quad (3.2)$$

and $$\underline{R}_\eta = E\{\underline{\eta}\underline{\eta}^H\} \quad (3.3)$$

$$= E\{(H_{j,i}\underline{p}_{2,i}d_{2,j,i} + \underline{n}_{1,j,i})(H_{j,i}\underline{p}_{2,i}d_{2,j,i} + \underline{n}_{1,j,i})^H\}$$

$$= E_d H_{j,i}\underline{p}_{2,i}\underline{p}_{2,i}^H H_{j,i}^H + \underline{R}_n$$

In case of an only additive white Gaussian noise (AWGN), (3.3) results in $$R_\eta = E_d H_{j,i} \underline{p}_{2,i} \underline{p}_{2,i}^H H_{j,i}^H + N_0 I. \quad (3.4)$$

Here the symbol behind the IRC receiver can be shown as $$\overline{d}_{1,j,i} = \underline{m}_{IRC}^H \underline{r}_{j,i} \quad (3.5)$$

$$= \underline{m}_{IRC}^H H_{j,i} \underline{p}_{1,j} d_{1,j,i} + \underline{m}_{IRC}^H \underline{\eta}$$

$$= d_{1,j,i} + \frac{\underline{p}_{1,j}^H H_{j,i}^H R_\eta^{-1}}{\underline{p}_{1,j}^H H_{j,i}^H R_\eta^{-1} H_{j,i} \underline{p}_{1,i}} (H_{j,i}\underline{p}_{2,i}d_{2,j,i} + \underline{n}_{1,j,i}).$$

In the receiver in question here, this may represent, therefore, a linear receiver.

Contrary thereto, the SU MRC receiver for MU-MIMO transmission can be shown as $$m_{MRC}^H = \underline{p}_{1,i}^H H_{j,i}^H. \quad (3.6)$$

and the detected signal for the UE with index 1 is $$\overline{d}_{1,j,i} = \underline{m}_{MRC}^H \underline{r}_1 \quad (3.7)$$

$$= \underline{p}_{1,j,i}^H H_{j,i}^H H_{j,i} \underline{p}_{1,j,i} d_{1,j,i} + \underline{p}_{1,j,i}^H H_{j,i}^H \underline{\eta}.$$

In the following, three algorithms are indicated, according to which information can be estimated regarding the pre-coding vector for a paired UE in the UE in question. The first algorithm estimates the information based on the approximated, calculated covariance matrix of the interfering channel, the second algorithm estimates the information based on an approximated, calculated energy of the interfering channel, and the third algorithm estimates the information based on an approximated, calculated SINR (SINR: Signal-to-Interference and Noise Ratio), i.e., based on a signal-to-interference and noise ratio for the paired UE signal or signals. These three algorithms show different complexities and lead to different system performance. In the following, these three example algorithms are explained using the example of a blind estimation of the pre-coding vector $p_{2,j,i}$.

1. Estimation of the Pre-coding Vector Based on the Covariance Matrix

Based on the system function according to (2.1), using the definition of a coherent band in which MIMO channels behave similarly, the covariance matrix of the signal received in this coherent band can be shown as $$\underline{R}_r = E\{(\underline{r}_{1,j,i} - E\{\underline{r}_{1,j,i}\})(\underline{r}_{1,j,i} - E\{\underline{r}_{1,j,i}\})^H\} \quad (3.8)$$

$$= E_d H_{j,i} \underline{p}_{1,i} \underline{p}_{1,i}^H H_{j,i}^H + E_d H_{j,i} \underline{p}_{2,i} \underline{p}_{2,i}^H H_{j,i}^H + \underline{R}_n$$

Due to the fact that $H_{j,i}$ and $p_{1,j,i}$ of the UE in question are known, $H_{j,i} p_{2,j,i} p_{2,j,i}^H H_{j,i}^H$ can be obtained by subtracting the covariance matrix of the effective channel, i.e., $H_{j,i} p_{1,j,i} p_{1,j,i}^H H_{j,i}^H$, and the noise term of $R_r$ according to $$R_t = H_{j,i} \underline{p}_{2,i} \underline{p}_{2,i}^H H_{j,i}^H \quad (3.9)$$

$$= \frac{R_r}{E_d} - H_{j,i} \underline{p}_{1,i} \underline{p}_{1,i}^H H_{j,i}^H - \frac{R_n}{E_d}.$$

The matrix $R_r$ can be approximated within the coherent band according to the estimation theory of the population variance with samples. In order to increase the precision of the estimation of $R_r$ in strongly frequency-selective channels, the estimation may be performed over several OFDM symbols in a sub-frame. The process control during pre-coding may, for example, show a minimum granularity (duration) of one sub-frame, which means that the pre-coding vector $p_{2,j,i}$ of the UE in question will not change within an individual sub-frame. Such a process control in the UE-pairing is provided both in LTE as well as in LTE-advanced systems, for example. Accordingly, an estimation process with several OFDM symbols creates no systematic errors in a sub-frame.

Apart from this, for example, it may be assumed that UEs show a low velocity in an MU-MIMO transmission so that they may provide valid feedback information in an MU-MIMO transmission. In this regard, the coherence period of the MIMO channel is relatively long, and MIMO channels of specific sub-carriers are rather similar in several subsequent OFDM symbols. Consequently, the extension of the estimation process over several OFDM symbols can contribute to improving both the precision of the estimation of $R_r$ as well as the precision of the estimation of $p_2$.

It is assumed, without restricting the general concept, that in $N_{subc}^{coh}$ subsequent sub-carriers perform the same UE-pairing. The estimation process is performed via $N_{OFDM}$ OFDM symbols. The matrix $R_r$ in (3.8) can therefore be approximated by $$\tilde{R}_r = \frac{1}{N_{subc}^{coh} N_{OFDM}} \sum_{j=1}^{N_{OFDM}} \sum_{i=1}^{N_{subc}^{coh}} (\underline{r}_{j,i} \underline{r}_{j,i}^H), \quad (3.10)$$

The averaged covariance matrix of the effective channel within the coherence band can be calculated according to $$\tilde{R}_e = \frac{1}{N_{OFDM} N_{subc}^{coh}} \sum_{j=1}^{N_{OFDM}} \sum_{i=1}^{N_{subc}^{coh}} H_{j,i} \underline{p}_{1,i} \underline{p}_{1,i}^H H_{j,i}^H, \quad (3.11)$$

By inserting (3.11) into (3.10), the approximated covariance matrix of the interfering channel can be calculated according to $$\tilde{R}_t = \frac{\tilde{R}_r}{E_d} - \tilde{R}_e - \frac{R_n}{E_d} \quad (3.12)$$

$$= \frac{1}{E_d N_{subc}^{coh} N_{OFDM}} \sum_{j=1}^{N_{OFDM}} \sum_{i=1}^{N_{subc}^{coh}} (\underline{r}_{j,i} \underline{r}_{j,i}^H) -$$

$$\frac{1}{N_{OFDM}N_{subc}^{coh}}\sum_{j=1}^{N_{OFDM}}\sum_{i=1}^{N_{subc}^{coh}}H_{j,i}\underline{p}_{1,i}\underline{p}_{1,i}^H H_{j,i}^H, -\frac{R_n}{E_d}$$

The covariance matrix of the interfering channel with the predetermined paired pre-coding vector $p_{co}$ can be stated as follows:

$$\underline{R}_t(\underline{p}_{co}) = \frac{1}{N_{OFDM}N_{subc}^{coh}}\sum_{j=1}^{N_{OFDM}}\sum_{i=1}^{N_{subc}^{coh}}H_{j,i}\underline{p}_{co}\underline{p}_{co}^H H_{j,i}^H. \tag{3.13}$$

The actual paired pre-coding vector can then be calculated based on the criterion of minimum (Chordal) distance between (3.12) and (3.13) using different $p_{co} \in \wp$. This estimation process can be shown for example as $$\hat{\underline{p}}_2 = \arg\min_{\underline{p}_{co}\in\wp}\frac{1}{\sqrt{2}}\|\tilde{R}_r\tilde{R}_r^H - \underline{R}_t(\underline{p}_{co})R_t^H(\underline{p}_{co})\|_F, \tag{3.14}$$

with $\|\cdot\|_F$ marking the Frobenius norm of a given matrix.

If the same paired UE is paired by the system configuration over several coherent bands to the UE in question, an averaging operation can be applied in (3.14) in order to also calculate the averaged distance (also called "Chordal distance") over these bands, and $p_2$ can be estimated by minimizing the averaged distance.

For the frequency selective UE pairing situation in an MU-MIMO transmission, an estimation of the pre-coding vector $p_2$ according to (3.10)-(3.14) can be performed at the UE in question for each band in the complete system bandwidth, in which a new UE-pairing is performed by eNodeB. The size of this band is defined, for example, by LTE standards and amounts to $N_{subc}^{coh}=24$ sub-carriers, for example equivalent to 360 kHz with a width of 15 kHz per sub-carrier. Here and in other cases and other examples, $N_{OFDM} \geq 10$ may be preferred.

2. Estimation of the Paired Pre-Coding Vector Based on the Channel Energy

According to one example, the approximated channel energy of the interfering channel can be used as a matrix, in order to estimate the paired pre-coding vector (and/or more general information regarding it, as explained above). This approach can be performed both as an alternative as well as in combination with the above-described estimation of the covariance matrix of the interfering channel (and/or of information regarding it).

The signal energy of the received signal is calculated based on $$E_r = E\{(\underline{r}_1 - E\{\underline{r}_1\})^H(\underline{r}_1 - E\{\underline{r}_1\})\} \tag{3.15}$$

$$= E_d\underline{p}_{1,i}^H H_{j,i}^H H_{j,i}\underline{p}_{1,i} + E_d\underline{p}_{2,i}^H H_{j,i}^H H_{j,i}\underline{p}_{2,i} + tr\{R_n\},$$

with $tr\{R_n\}$ marking the trace of a given matrix. The energy of the interfering channel $p_{2,i}^H H_{j,i}^H H_{j,i} p_{2,i}$ can be calculated by subtracting the effective channel energy $p_{1,i}^H H_{j,i}^H H_{j,i} p_{1,i}$ and the noise term of $E_r$, namely $$E_t = \underline{p}_{2,i}^H H_{j,i}^H H_{j,i}\underline{p}_{2,i} \tag{3.16}$$

$$= \frac{E_r}{E_d} - \underline{p}_{1,i}^H H_{j,i}^H H_{j,i}\underline{p}_{1,i} - \frac{tr\{R_n\}}{E_d}.$$

It is assumed that the same paired UE in $N_{subc}^{coh}$ of subsequent sub-carriers is paired with the UE in question, with $N_{subc}^{coh}$ being defined as the number of sub-carriers in a coherent band. For example, the estimation process may be performed over $N_{OFDM}$ OFDM symbols. Similar to the determination of $\tilde{R}_r$ in the previous section 1, the received signal energy $E_r$ according to the estimation theory of the population variance with samples can be estimated from samples as $$\tilde{E}_r = \frac{1}{N_{subc}^{coh}N_{OFDM}}\sum_{j=1}^{N_{OFDM}}\sum_{i=1}^{N_{subc}^{coh}}(r_{1,j,i}^H r_{1,j,i}). \tag{3.17}$$

The determined channel energy of the effective channel within the coherent band can be calculated by $$\tilde{E}_e = \frac{1}{N_{OFDM}N_{subc}^{coh}}\sum_{j=1}^{N_{OFDM}}\sum_{i=1}^{N_{subc}^{coh}}\underline{p}_{1,i}^H H_{j,i}^H H_{j,i}\underline{p}_{1,i}, \tag{3.18}$$

$$= \underline{p}_1^H R_{H-Tx}\underline{p}_1$$

with $$R_{H-Tx} = \frac{1}{N_{OFDM}N_{subc}^{coh}}\sum_{j=1}^{N_{OFDM}}\sum_{i=1}^{N_{subc}^{coh}}H_{j,i}^H H_{j,i}, \tag{3.19}$$

representing the estimated maximum likelihood (ML) of the transmission-correlation matrix. It can be assumed that $p_{1,i}$ in the coherent band is independent from sub-carriers, i.e., $p_{1,i}=p_1, i=1,\ldots,N_{subc}^{coh}$. This assumption is fulfilled in the LTE standards, for example, in which $p_1$ is identical either in the entire system bandwidth or in a sub-band. The size of the sub-band is a parameter which may depend on the system bandwidth, and it is generally identical or larger than the already defined coherent band.

By applying (3.18) on (3.17), the approximated channel energy of the interfering channel can be calculated as $$\tilde{E}_t = \frac{\tilde{E}_r}{E_d} - \tilde{E}_e - \frac{N_R N_0}{E_d} \tag{3.20}$$

$$= \frac{1}{E_d N_{subc}^{coh}N_{OFDM}}\sum_{j=1}^{N_{OFDM}}\sum_{i=1}^{N_{subc}^{coh}}(r_{1,j,i}^H r_{1,j,i}) - \underline{p}_1^H R_{H-Tx}\underline{p}_1 - \frac{tr\{R_n\}}{E_d}$$

The averaged channel energy of the interfering channel with the given paired pre-coding vector $p_{co}$ is defined as $$E_t(p_{co}) = \underline{p}_{co}^H R_{H-Tx}\underline{p}_{co}. \tag{3.21}$$

The actually paired pre-coding vector can be estimated based on the criterion of a minimum difference between (3.20) and (3.21) with different $p_{co} \in \wp$. This procedure can be illustrated, for example, by $$\hat{p}_2 = \arg\min_{p_{co}\in\wp} |\tilde{E}_t - E_t(p_{co})|, \quad (3.22)$$

The estimation procedure represented by (3.18)-(3.22) requires less calculating efforts than the procedure described under section 1, because the calculation of matrices is replaced by a calculation of scalars. Furthermore, (3.19) needs to be calculated only once for the computation of (3.21) for all $p_{co}\in\wp$, which also reduces the complexity of the estimation process.

3. Estimation of the Paired Pre-Coding Vector Based on SINR

According to one example, the estimation of the pre-coding vector $p_2$ can be carried out based on a calculation and estimation of another metric, namely the SNR of the paired UE at the UE in question and by maximizing this metric. This procedure may be performed alternatively or in combination with one or both of the above-described processes, which are based on an estimation of the interfering channel using the calculation and estimation of statistic sizes of the interfering channel (either of the covariance matrix or the energy).

Unlike a known IRC receiver structure, which converts the interference of the paired UE at the UE in question into white noise, here first the desired signal is filtered at the UE in question with a whitening-filter and the modified matched filter $$R_s^{-1/2} = E_d H_1 p_1 p_1^H H_1^H + N_0 I. \quad (3.23)$$

and the modified matched filter $$p_{co}^H H_1^H R_s^{-1/2} = p_{co}^H H_1^H (E_d H_1 p_1 p_1^H H_1^H + N_0 I)^{-1/2} \quad (3.24)$$

is applied to the whitened signal vectors with different $p_{co}\in\wp$. The pre-coding vector $p_{co}$, resulting in the largest SINR in reference to the interfering signal at the UE in question $$\gamma_{t,Post\text{-}SINR} = p_{co}^H H_1^H R_s^{-1} H_1 p_2 p_2^H H_1^H R_s^{-1} H_1 p_{co} / p_{co}^H H_1^H R_s^{-1} H_1 p_{co}. \quad (3.25)$$

is here assumed as the estimated pre-coding vector $p_2$. The SINR discussed here can also be called a post-SINR due to the previous filtering by the whitening filter.

The idea underlying this algorithm comprises improving the estimation of $p_2$ by increasing the interfering portions and suppressing the desired signal. In this case, the estimation can become more reliable and the probability of an erroneous determination of $p_2$ can be reduced.

In the following, a detailed procedure of this estimation algorithm is shown as an example. Once more the starting point is the system function according to (2.1). Similar to the above-described algorithms, here it can be assumed that the same UE-pairing (i.e., the same UE paired to the UE in question) is performed in $N_{subc}^{coh}$ subsequent sub-carriers. The estimation process is performed with $N_{OFDM}$ OFDM symbols.

In the $j^{th}$ OFDM symbol and the $i^{th}$ sub-carrier at the UE in question, the equalizer filter (IRC-filter) can be shown with regards to the paired UE signals by $$m_{t,j,i}^H(p_{co}) = p_{co}^H H_{j,i}^H (E_d H_{j,i} p_{1,i} p_{1,i}^H H_{j,i}^H + N_0 I)^{-1}, \quad (3.26)$$

and represents a function of the selected pre-coding vector $p_{co}$. The energy of the filtered signals can be approximated by $$\tilde{E}_{3,j,i}(p_{co}) = |m_{t,j,i}^H(p_{co}) \cdot r_{j,i}|^2. \quad (3.27)$$

It is known that the following relationship applies $$E_{1,j,i}(p_{co}) = E\{m_{t,j,i}^H r_{j,i} r_{j,i}^H m_{t,j,i}\} \quad (3.28)$$
$$= |p_{co}^H H_{j,i}^H R_s^{-1} H_{j,i} p_2|^2 + p_{co}^H H_{j,i}^H R_s^{-1} H_{j,i} p_{co}.$$

Accordingly, the energy of interfering signals can be approximated after the filter, i.e., $|p_{co}^H H_{j,i}^H R_s^{-1} H_{j,i} p_2|^2$ by using (3.27) in (3.28) and yields $$\tilde{E}_{t,j,i}(p_{co}) = \tilde{E}_{t,j,i}(p_{co}) - \tilde{E}_{e,j,i}(p_{co}). \quad (3.29)$$

with $$\tilde{E}_{e,j,i}(p_{co}) = |m_{t,j,i}^H(p_{co}) \cdot H_{j,i} p_{co}|^2. \quad (3.30)$$

Finally, the post-SINR can be approximated in reference to the interfering signals to the UE in question by $$\gamma_{t,Post}(p_{co}) = \tilde{E}_{t,j,i}(p_{co}) / \tilde{E}_{e,j,i}(p_{co}) \quad (3.31)$$
$$= |m_{t,j,i}^H(p_{co}) \cdot r_{j,i}|^2 / |m_{t,j,i}^H(p_{co}) \cdot H_{j,i} p_{co}|^2 - 1.$$

When using an averaging operation on (3.31), using $N_{subc}^{coh}$ of successive sub-carriers and $N_{OFDM}$ OFDM symbols, the averaged post-SINR can be stated with regards to interfering signals by $$\bar{\gamma}_{t,Post} = \frac{1}{N_{subc}^{coh} N_{OFDM}} \sum_{j=1}^{N_{OFDM}} \sum_{i=1}^{N_{subc}^{coh}} \left( \frac{|m_{t,j,i}^H(p_{co}) \cdot r_{j,i}|^2}{|m_{t,j,i}^H(p_{co}) \cdot H_{j,i} p_{co}|^2} - 1 \right). \quad (3.32)$$

Using the criterion of maximizing the post-SINR, the estimated pre-coding vector $p_2$ can be obtained by maximizing the equation (3.32) with $p_{co}\in\wp$ and shown as $$\hat{p}_2 = \arg\max_{p_{co}\in\wp} \bar{\gamma}_{t,Post}(p_{co}) \quad (3.33)$$
$$\stackrel{\Delta}{=} \arg\max_{p_{co}\in\wp} \sum_{j=1}^{N_{OFDM}} \sum_{i=1}^{N_{subc}^{coh}} \left( \frac{|m_{t,j,i}^H(p_{co}) \cdot r_{j,i}|^2}{|m_{t,j,i}^H(p_{co}) \cdot H_{j,i} p_{co}|^2} \right).$$

In the described algorithms and embodiments, using the received data scanning values, approximated correlation coefficients of the interfering channel are calculated. Based on the knowledge of the entire pre-coding vector codebook, from which the pre-coding vector is selected for the paired UE, the approximated correlation coefficients of the interfering channel can be quantified to discrete results (comprising the MIMO channel coefficient and all possible pre-coding vectors). An ML criterion can then be used to estimate the most probable pre-coding vector of the paired UE (or information regarding it).

FIG. 1 illustrates in a simplified manner the design of a transmitter (in eNodeB) and a receiver in UE-1 of a physical channel according to one embodiment. UE-1 may represent the UE in question according to the above-stated embodiments.

The transmitter in eNodeB can transmit data streams for several UEs in the manner described. As illustrated in FIG. 1 as an example, the first transmitter 100, transmitting data for the UE-1 in question, and a second transmitter 200, transmitting data for the paired UE (not shown in FIG. 1), may be present in eNodeB.

Both transmitters 100, 200 may be designed identically and may, for example, each comprise a modulator 101 or 201, respectively, as well as a pre-coder 102 or 202, respectively, switched downstream in reference to the respective modulator 101 or 201.

The modulators 101, 201 can convert a code word according to one or more modulation schemes into symbols $d_1$ or $d_2$ respectively. For example, the modulators 101, 201 may use one of the modulations schemes QPSK, 16QAM, 64QAM, or another modulation scheme.

The pre-coders 102, 202 perform a pre-coding of the modulated symbols. Here, the pre-coder 102 applies a different pre-coding (i.e., a different pre-coding vector) than the pre-coder 202. The pre-coding may depend, for example, on whether a spatial multiplexing is used and, if this is the case, on which cyclic delay diversity (CDD) is used. A pre-coding is described for the standard LTE, for example, in the technical specification 3GPP TS 36.211 V8.9.0 (2009-12), "Evolved Universal Terrestrial Radio Access (E-UTRA); Physical Channels and Modulation" in chapter 6.3—"General structure for downlink physical channels," and particularly the sub-chapter 6.3.4—"Pre-coding," which is incorporated into the content of the present disclosure by way of reference.

The illustration of the transmitters 100, 200 in FIG. 1 is simplified. As known to one skilled in the art, other signal processing steps, for example scrambling, layer mapping, resource element mapping, etc., may be provided. For this purpose, reference is made to Diagram 6.3-1 of the above-mentioned standard and the corresponding descriptions in chapters 6.3.1-6.3.5, which are also incorporated into the content of the present paper by way of reference.

Further, in the transmitters 100, 200, in the signal path after pre-coding 102, 202, a generation of the transmission signal occurs, for example in the form of an OFDM signal generation, which is not shown in FIG. 1 for reasons of clarity.

A receiver 300 in UE-1 may show an equalizer 301, a demodulator 302, and a channel decoder 303. An output of the equalizer 301 may be coupled with the input of the demodulator 302, and an output of the demodulator 302 may be coupled to the input of the channel decoder 303. As known from prior art, additional signal processing units, such as a descrambler, may be provided in the receiver 300, which for reasons of a simplified illustration are not shown in FIG. 1.

Overall, the transmitters 100 and 200 show $N_R$ transmission antennas. The receiver 300 in the UE-1 in question comprises $N_T$ receiving antennas. The system function specific to the sub-carrier according to (2.1) determines the input of the equalizer 301 via the data vector received by the $N_T$ antennas with coefficients in the form of digital sampling values.

The data signal for UE-1, equalized by the equalizer 301, is e.g. demodulated after additional intermediate signal processing steps by the demodulator 302, according to the modulation scheme used in the modulator 101 of the transmitter 100.

The signal modulated by the demodulator 302 is subjected in the decoder 303 to a channel decoding process, perhaps after additional intermediate signal processing steps. The channel decoder 303 may, for example, be a turbo-decoder. The output of the channel decoder 303 yields—perhaps after additional intermediate signal processing steps—the data transmitted by the transmitter 100 in the form of estimations $\hat{d}_1$.

For the IA equalization of the signal for the UE-1 in question, the equalizer 301 requires knowledge regarding the pre-coding vectors $p_1$ and $p_2$ used in the pre-coders 102 and 202 from the received data vectors according to the equation (2.1). The knowledge regarding $p_1$ occurs by signaling this vector of eNodeB to UE-1. The knowledge regarding $p_2$ is estimated according to one or more of the above-described algorithms from the data vectors received according to (2.1) via the $N_R$ receiver antennas.

As explained above, this estimation may be based on a calculation or evaluation of statistic features (covariance matrix and/or average energy) of the interfering signal using the received data vectors or, after a transformation of the signal determined for the UE-1 in question into white noise (so-called "whitening"), a post-SINR analysis of the white-filtered signal can occur using various pre-coding vectors, with the desired pre-coding vector $p_2$ maximizing the SINR in reference to the interfering signal at the UE-1 in question. Any signaling of the pre-coding vector $p_2$ for the paired UE of eNodeB to UE-01 is not performed. The estimation of the pre-coding vector $p_2$ for the paired UE-1 occurs therefore blindly. Of course, in this blind estimation the information signaled by eNodeB regarding the pre-coding vector $p_1$ can be used for the UE-1 in question. Additionally, in the above-described manner, data of the received data vector and the MIMO channel coefficients yielded via channel estimation are used in the blind estimation of the pre-coding vector $p_2$ or, as the case may be, of information regarding it.

Figure 2:
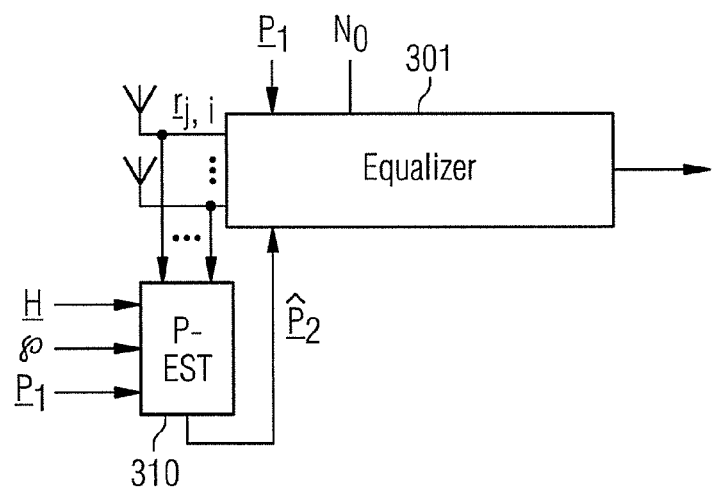
FIG. 2 shows an example of a block diagram of an equalizer and a unit for estimating information regarding a pre-coding vector.

FIG. 2 shows in an example block diagram of the equalizer 301 as well as the estimation unit 310. The estimation unit 310 is a unit for a blind estimation of information regarding the pre-coding vector $p_2$ for the paired UE-2.

The estimation unit 310 may show $N_R$ inputs, each connected to one of the receiver antennas of the UE-1. Via these inputs, the received data vectors can be serially forwarded to the estimation unit 310 according to the equation (2.1). The estimation unit 310 comprises an output by which it emits information regarding the estimated pre-coding vector $p_2$ for the paired UE. This information is then forwarded to the equalizer 301. This information may relate to the estimated, complete pre-coding vector $p_2$ for the paired UE; however, it is also possible that the information represents a parameter deducted from the pre-coding vector $p_2$ and/or only includes partial information regarding the vector.

As indicated in FIG. 2, the estimated MIMO channel matrix $H_{j,i}$, the signalized pre-coding vector $p_1$ for the UE-1 in question, as well as the pre-coding vector codebook $\wp$ can be routed to the estimation unit 310. Suitable algorithms for estimating the information regarding the pre-coding vector $p_2$ based on these input parameters have been explained above.

The equalizer 301 performs an equalization of the physical channel based on the received data vectors (see equation (2.1)), the signaled pre-coding vector $p_1$, the blindly estimated information regarding the pre-coding vector $p_2$, as well as, for example, the noise $N_0$ and optionally additional information. At the output of the equalizer 301, an equalized data stream is emitted, which is largely free from interferences, caused at the UE-1 by the operation of the paired UE(s) on the same recourse with (one) other pre-coding vector(s).

The resources available at an OFDM system may be marked by a time statement and a frequency statement and shown in the form of a resource grid. One element of this resource grid may show a resource, for example. In the above-stated technical specification 3GPP TS 36.211 V8.9.0 (2009-12) of the Standards LTE (Rel. 8), the resources are shown by a resource grid for each time slot, which is designed based on the number of sub-carriers and the number of OFDM symbols in the time slot. The chapter 6.2—"Slot structure and physical resource elements" of the above-mentioned standard is incorporated into the content of the present disclosure by way of reference.

The operation of the blind receiver 300 in the UE-1 in question in an MU-MIMO transmission is as follows: First, the received data $r_{1,j,i}$ is collected, the channel information $H_{j,i}$ estimated, and the internal pre-coding vector $p_{1,i}$ signaled by eNodeB is determined from a part or all of the sub-carriers $i=1, 2, \ldots N_{subc}$ and a part or all of the $N_{OFDM}$ OFDM symbols. Then, according to the system settings, the paired pre-coding vectors $p_2$ can be determined in each UE-pairing band (typically $N_{subc}^{coh}=24$) with the data collected. Here, one or more of the procedures described above in sections 1-3 may be used. Finally, the estimated pre-coding vector $\hat{p}_2$ in (3.2) is used and the receiver filter (in the following also called IRC filter, as an example) in (3.1) is adjusted in each sub-carrier in order to equalize and detect the desired signal $d_{1,j,i}$, which is transmitted according to (2.1).

Figure 3:
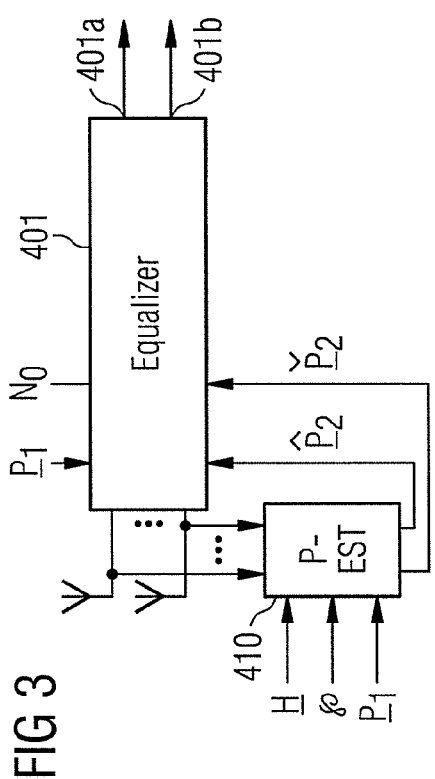
FIG. 3 shows an example of a block diagram of an equalizer and a unit for estimating information regarding a pre-coding vector.

FIG. 3 shows an equalizer 401 as well as an estimation unit 410 according to one embodiment of the invention. The equalizer 401 differs from the equalizer 301 only in that it comprises two inputs for one information each via a precoding vector for a paired UE as well as two outputs 401a, 401b for equalized data streams. At the first output 401a, a first data stream is output, which is generated by the blind IRC filter using the estimated pre-coding vector $\hat{p}_2$ according to one of the above-described algorithms. A differently filtered data stream is emitted at the second output 401b, created by a blind IRC filter using a second estimated pre-coding vector $\check{p}_2$. The second estimated pre-coding vector $\check{p}_2$ may represent the second-best estimated pre-coding vector for the paired UE. This second-best estimated pre-coding vector $\check{p}_2$ can be obtained using the algorithms explained above in sections 1-3 according to the following equations $$\check{p}_2 = \underset{p_{co} \in \{\wp \backslash \hat{p}_2\}}{\operatorname{argmin}} \frac{1}{\sqrt{2}} \left\| \tilde{R}_t \tilde{R}_t^H - R_t(p_{co}) R_t^H(p_{co}) \right\|_F, \quad (3.34)$$

$$\check{p}_2 = \underset{p_{co} \in \{\wp \backslash \hat{p}_2\}}{\operatorname{argmin}} \left| \tilde{E}_t - E_t(p_{co}) \right|, \quad (3.35)$$

$$\check{p}_2 = \underset{p_{co} \in \{\wp \backslash \hat{p}_2\}}{\operatorname{argmax}} \sum_{j=1}^{N_{OFDM}} \sum_{i=1}^{N_{subc}^{coh}} \left( \frac{|m_{t,j,i}^H(p_{co}) \cdot r_{j,i}|^2}{|m_{t,j,i}^H(p_{co}) \cdot H_{j,i} p_{co}|^2} \right). \quad (3.36)$$

I.e., the second estimated pre-coding vector can be estimated according to the same algorithm as the first pre-coding vector. However, it is also possible to estimate the second pre-coding vector according to a different algorithm than the best pre-coding vector, i.e., to use competing, different algorithms.

In one embodiment, the equalizer 401 according to FIG. 3 is implemented in a receiver 300 according to FIG. 1. In this case, the equalized (i.e., blind IRC filtered) data stream is forwarded to the demodulator 302 at the output 401a and subsequently decoded in the channel decoder 303. If the channel decoder 303 decodes the correctly transmitted data word (e.g., transportation block) the equalized (i.e., blind IRC filtered) data stream of the equalizer 401 at the second output 401b is not required and the process is finished. Otherwise, if the decoded data word (transportation block) is erroneous, the data stream at the second output 401b of the equalizer 401 is routed to the demodulator 302, demodulated here, and then decoded in the channel decoder 303. If the estimated pre-coding vector $\hat{p}_2$ for the data stream has been estimated falsely at the first output 401a, a high probability is given that the pre-coding vector $\check{p}_2$ estimated with the second-best probability or a different algorithm is the pre-coding vector actually used in the transmitter 200 for the paired UE. In this case, the equalization and channel decoding of the data stream performed at the second output 401b of the equalizer 401 leads to the generation of the correct data word (transportation block).

According to one example, the receiver 300 of UE-1 comprises two parallel arranged demodulators 302, with the first demodulator demodulating the data stream emitted at the first output 401a of the equalizer 401 and the second demodulator demodulating the second data stream emitted at the output 401b of the equalizer 401. Thus, the two demodulators concurrently provide a first data stream based on the estimated pre-coding vector $\hat{p}_2$ and a second data stream based on the estimated pre-coding vector $\check{p}_2$ with the second-highest probability or based on another algorithm. These two data streams can finally be decoded in the channel decoder 303 in the above-described fashion (first the data signal demodulated based on the pre-coding vector $\hat{p}_2$ and, if the channel decoding fails, then the demodulated data signal based on the pre-coding vector $\check{p}_2$). A simultaneous channel decoding of the two data streams by using two parallel arranged channel decoders 303 is also possible, as explained in greater detail in the following.

Figure 4:
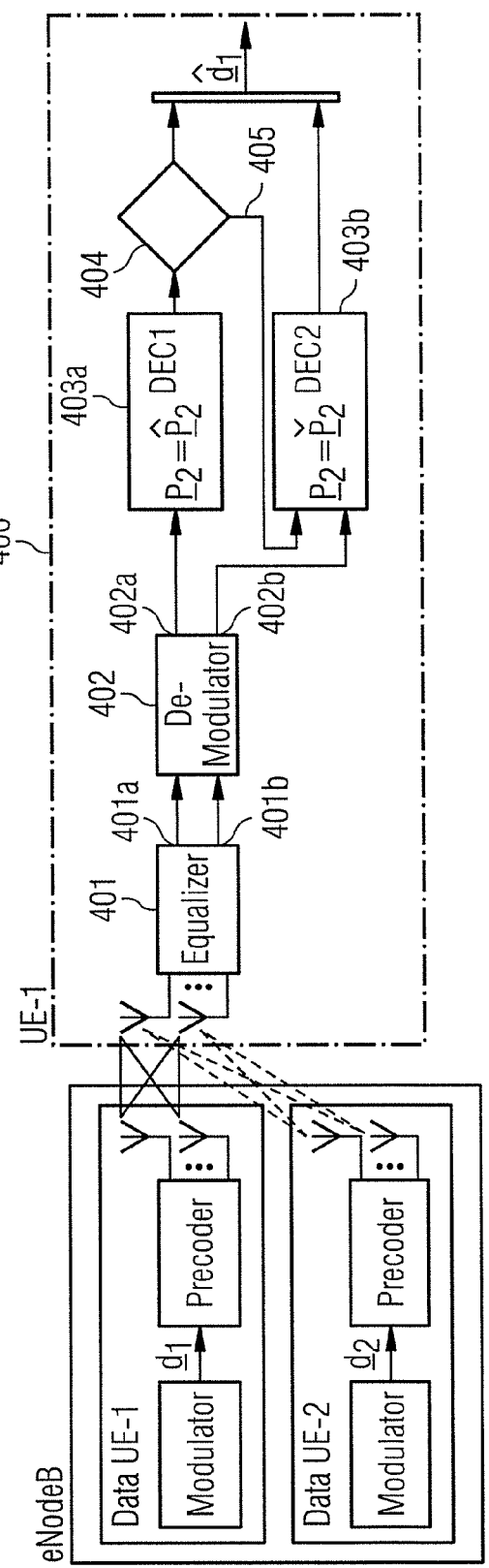
FIG. 4 shows an example of a block diagram of a transmitter and a receiver of a physical channel.

FIG. 4 shows as an example a receiver 400 of UE-1 according to another embodiment of the invention. The receiver 400 may comprise an equalizer 401 of FIG. 3, a two-channel demodulator 402, two parallel channel decoders 403a, 403b, as well as a data word test unit or decision unit 404.

As described above, the two-channel demodulator 402 comprises two parallel arranged demodulators, which concurrently demodulate the data streams obtained from the outputs 401a and 401b of the equalizer 401. At the two outputs 402a and 402b of the demodulator 402, therefore, two demodulated data streams are provided, with the first demodulated data stream provided at the first output 402a being generated based on the estimated pre-coding vector $\hat{p}_2$ and the demodulated data stream provided at the second output 402b being generated based on the estimated pre-coding vector $\check{p}_2$.

The receiver 400 comprises at least two channel decoders 403a and 403b. The two channel decoders 403a, 403b may represent turbo-decoders. These two channel decoders 403a, 403b may be designed identically in one embodiment.

An output of the first channel decoder 403a is routed to the test unit 404. The test unit 404 examines if the decoded data word (transportation block) is correct, i.e., equivalent to the transmitted data word (transportation block). If this is the case, the receipt of the data word (transportation block) is considered successful and the decoded data word (transportation block) is forwarded to the output of the receiver 400.

If no successful generation of the transmitted data word (transportation block) is determined, the test unit 404 decides that another channel decoding must be performed. The test unit 404 instructs the second channel decoder 403b via a control line 405 to decode the demodulated signal provided at the second output 402b of the demodulator 402. The decoding result is then forwarded to the output of the receiver 400, perhaps after another test for data integrity.

According to one example, the first channel decoder 403a and the second channel decoder 403b are always operated parallel and simultaneously based on the outputs 402a and 402b of the demodulator 402, i.e., a control line 405, by which the second channel decoder 403b is only activated in case the first channel decoding fails, is omitted here. In this case, a decoded data word is provided at the output of the first channel decoder 403a, generated based on the estimated first pre-coding vector $\hat{p}_2$, and at the output of the second channel decoder 403b a decoded data word is provided based on the estimated second pre-coding vector (for example, $\check{p}_2$, or estimated according to another algorithm). Using a test unit examining the outputs of the two channel decoders 403a and 403b, the error-free decoded data word (transportation block) can be determined and forwarded to the output of the receiver 400.

The examples described with the two parallel operated channel decoders 403a, 403b offer the advantage of a quicker decoding, while the previously described examples, illustrated based on FIG. 4, allow a power-saving detection of the correct data word (transportation block) in a sequential operation of the two channel decoders 403a, 403b.

Using two channel decoders 403a, 403b, the probability can be increased of receiving error-free data words (transportation blocks). In UEs equipped with a receiver capable of performing a signal detection in an SU-MIMO transmission mode with spatial multiplexing, in which several data streams are fed parallel to the UE and determined for said UE, two channel decoders 403a, 403b are required for a correct channel decoding of the data streams. Thus, in many MIMO receivers at least two channel decoders are provided anyway, for example in the form of turbo decoders. This particularly also applies for UEs according to the LTE standard. Accordingly, it may be provided for the MU-MIMO transmission discussed here to use these two channel decoders 403a, 403b for an improved channel decoding of filtered data streams based on two differently estimated pre-coding vectors (for example, $\hat{p}_2$ and $\check{p}_2$).

Figure 5:
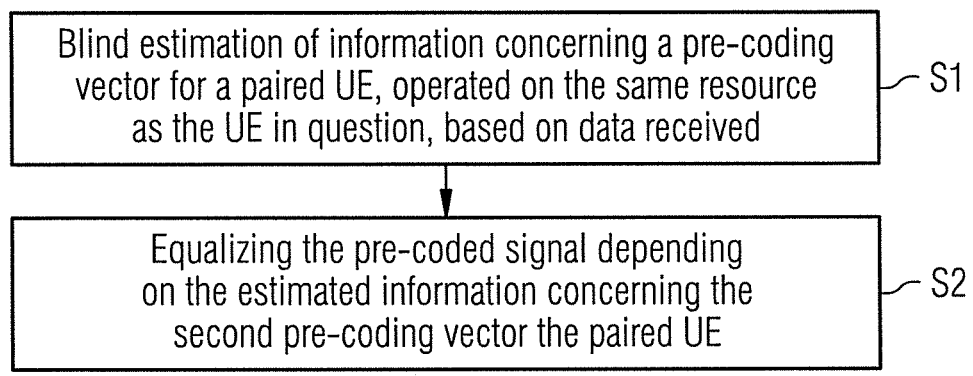
FIG. 5 shows a flow chart of a signal processing method in a receiver.

FIG. 5 illustrates a flow chart of a signal processing method in an MU-MIMO receiver (e.g., 300 or 400) according to an embodiment.

At S1, a blind estimation of information can occur via a pre-coding vector for a paired UE, which is operated on the same resource as the UE in question, based on data received.

At S2, the equalization of the pre-coded signal can occur based on the estimated information using the pre-coding vector for the paired UE.

Here, the blind estimation of the information via a precoding vector for the paired UE may comprise the calculation and estimation of a statistic parameter (for example, covalence matrix and/or energy) of an interfering channel for the paired UE. For example, this may also comprise the calculation and estimation of a signal-to-noise ratio.

Figure 6:
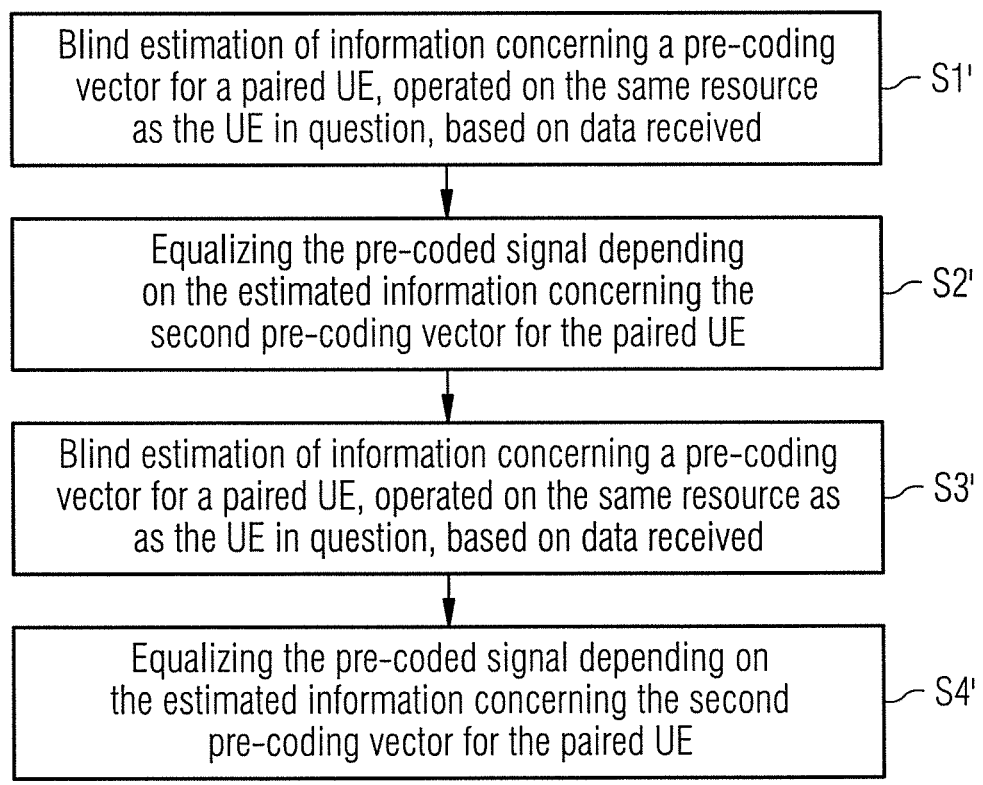
FIG. 6 shows a flow chart of a signal processing method in a receiver.

FIG. 6 illustrates a flow chart of a signal processing method in an MU-MIMO receiver (e.g., 300 or 400) according to one embodiment.

At S1', a blind estimation of information can occur via a first pre-coding vector for a paired UE, which is operated on the same resources as the UE in question, based on received data.

At S2', equalization of the pre-coded signal can occur based on the estimated information using the first pre-coding vector for the paired UE.

At S3', which may perhaps be performed concurrently (i.e., in parallel) with S1', a blind estimation of a piece of information can occur via a second pre-coding vector for the paired UE, operated on the same resource as the UE in question, based on received data, with the second pre-coding vector being different from the first pre-coding vector.

At S4', equalization of the pre-coded signal can occur based on the estimated information using the second pre-coding vector for the paired UEs.

The acts S1' and S3', as well as the acts S2' and S4' may each be performed either concurrently (parallel) or successively (sequentially).

Simulations were performed with a blind IRC receiver in LTE systems with an MU-MIMO transmission using the above-stated algorithms. They showed that the blind IRC receiver reaches the QoS (Quality of Service) specified in LTE and is superior to MRC-receivers in all tested scenarios. Good results were obtained particularly in the scenarios with $N_T$=4, i.e., a large pre-coding vector code book. An estimation of the pre-coding vector $p_2$ was performed based on a single OFDM symbol per sub-frame. A PMI-selection for the entire bandwidth of the system occurred once per sub-frame. The modulation and code rates amounted to CQI4 (QPSK/code rate=0.302), CQI7 (16QAM/code rate=0.365), CQI10 (64QAM/code rate=0.456), CQI13 (64QAM/code rate=0.760), the same CQI-value was allocated to both UEs. The carrier frequency amounted to 2 GHz, the system band width amounted to 10 MHz, the scanning rate 15.36 MHz, $N_{subc}$=600, the sub-carrier distance amounted to 15 kHz, the sub-frame had a length (TTL) of 14 OFDM symbols, and a single transmission data stream (single layer) was assumed. The above statements relate to the simulation; of course, they can also be used in embodiments.

Although a particular feature or a particular aspect of an embodiment of the invention may have been disclosed in reference to only one of several optional embodiments, such a feature or such an aspect may additionally be combined with one or more other features or aspects of the other embodiments. To the extent the terms "including," "showing," "with," or other variants thereof are used either in the description or in the claims, such terms shall further be considered inclusive, similar to the term "comprising."

Further, the embodiments may be implemented in discrete circuits, partially integrated circuits, or entirely integrated circuits or in programming means (software).

What is claimed is:

1. A multi-user multiple input multiple output (MU-MIMO) receiver of a user equipment (UE) in question for detecting a pre-coded signal, comprising:
a unit configured to perform a blind estimation of information concerning a pre-coding vector for a paired UE, which is operated on a same resource as the UE in question, based on a received signal that includes the pre-coded signal,
wherein the unit configured to blindly estimate information concerning a pre-coding vector for the paired UE further comprises a whitening filter configured to convert the signal pre-coded for the MU-MIMO receiver into white noise, and
wherein the unit configured to perform the blind estimation of information concerning a pre-coding vector for the paired UE is further configured to calculate and estimate a signal-to-noise ratio of the whitened signal and use the signal-to-noise ratio in performing the blind estimation, and
an equalizer configured to equalize the pre-coded signal based on the estimated information concerning the pre-coding vector for the paired UE.

2. The MU-MIMO receiver according to claim 1, wherein the unit configured to blindly estimate information concerning a pre-coding vector for the paired UE is further configured to calculate and estimate a statistic parameter of an interfering channel for the paired UE.

3. The MU-MIMO receiver according to claim 2, wherein the statistic parameter comprises a covariance matrix of the interfering channel for the paired UE.

4. The MU-MIMO receiver according to claim 2, wherein the statistic parameter comprises an energy of the interfering channel for the paired UE.

5. The MU-MIMO receiver according to claim 2, wherein the estimation comprises use of a maximum-likelihood criterion using a pre-coding vector codebook.

6. The MU-MIMO receiver according to claim 1, wherein the same resource represents a frequency jointly used by the UE in question and the paired UE, or a time period jointly used by the UE in question and the paired UE, or an element in the frequency- and time-domain jointly used by the UE in question and the paired UE.

7. The MU-MIMO receiver according to claim 1, wherein the unit configured to blindly estimate information concerning a pre-coding vector is configured to estimate this information for the paired UE without any a priori knowledge regarding the interfering channel for the paired UE.

8. The MU-MIMO receiver according to claim 1, wherein the equalizer comprises a linear detector.

9. The MU-MIMO receiver according to claim 1, wherein the MU-MIMO receiver comprises an Orthogonal Frequency Division Multiplexing (OFDM) receiver.

10. The MU-MIMO receiver according to claim 1, wherein the MU-MIMO receiver is compatible with the Long Term Evolution (LTE) standard.

11. A multi-user multiple input multiple output (MU-MIMO) receiver of a user equipment (UE) in question, comprising:
a first unit configured to blindly estimate information concerning a first pre-coding vector for a paired UE, which is operated on a same resource as the UE in question, based on a received signal that includes the pre-coding signal,
a first equalizer configured to equalize the pre-coded signal based on the estimated information concerning the first pre-coding vector,
a second unit configured to blindly estimate information concerning a second pre-coding vector for the paired UE, operated on the same resource, based on the received signal, wherein the second pre-coding vector is different from the first pre-coding vector,
a second equalizer configured to equalize the pre-coded signal based on the estimated information concerning the second pre-coding vector,
a first channel decoder with an input coupled to an output of the first equalizer,
a second channel decoder with an input coupled to an output of the second equalizer, and
a deciding unit coupled to an output of the first channel decoder and to an output of the second channel decoder, and configured to decide which of the outputs of the first and second channel decoders provides a correctly decoded signal.

12. The MU-MIMO receiver according to claim 11, wherein the first pre-coding vector is a most probable pre-coding vector for the estimation, and the second pre-coding vector is a second-most probable pre-coding vector for the estimation.

13. A method for detecting a pre-coded signal in a multi-user multiple input multiple output (MU-MIMO) receiver of a user equipment(UE) in question, comprising:
blindly estimating information regarding a pre-coding vector for a paired UE, which is operated on a same resource as the UE in question, based on a received signal that includes the pre-coded signal,
wherein blindly estimation information regarding the pre-coding vector for the paired UE further comprises filtering the signal pre-coded for the MU-MIMO receiver to convert the signal pre-coded for the MU-MIMO receiver into white noise,
wherein blindly estimating information via a pre-coding vector for the paired UE comprises calculating and estimating a signal-to-noise ratio of the whitened signal and using the signal-to-noise ratio in performing the blind estimation, and
equalizing the pre-coded signal based on the estimated information concerning the pre-coding vector for the paired UE.

14. The method according to claim 13, wherein blindly estimating the information concerning a pre-coding vector for the paired UE comprises calculating and estimating a statistic parameter of an interfering channel for the paired UE.

15. The method according to claim 14, wherein the statistic parameter comprises a covariance matrix of the interfering channel for the paired UE or an energy of the interfering channel for the paired UE, or a covariance matrix of the interfering channel for the paired UE and an energy of the interfering channel for the paired UE.

16. The method according to claim 14, with the estimating comprising a maximum-likelihood criterion using a pre-coding vector codebook.

17. A method for detecting a pre-coded signal in a multi-user multiple input multiple output (MU-MIMO) receiver of a user equipment (UE) in question, comprising:
blindly estimating information concerning a first pre-coding vector for a paired UE, operated on a same resource as the UE in question, based on a received signal that includes the pre-coded signal,
equalizing the pre-coded signal based on the estimated information concerning the first pre-coding vector for the paired UE,
blindly estimating information concerning a second pre-coding vector for the paired UE operated on the same resource as the UE in question, based on the received signal, wherein the second pre-coding vector is different from the first pre-coding vector,
equalizing the pre-coding signal based on the estimated information concerning the second pre-coding vector for the paired UE,
coupling an input of a first channel decoder to the equalized pre-coded signal based on the estimated information concerning the first pre-coding signal for the paired UE,
coupling an input of a second channel decoder to the equalized pre-coded signal based on the estimated information concerning the second pre-coding signal for the paired UE, and
deciding which of an output of the first channel decoder and an output of the second channel decoder provides a correctly decoded signal.

18. The method according to claim 17, wherein the first pre-coding vector is a most probable pre-coding vector for the estimation, and the second pre-coding vector is a second-most probable pre-coding vector for the estimation.

\* \* \* \* \*